United States Patent [19]

Miyasako et al.

[11] 4,415,919
[45] Nov. 15, 1983

[54] COLOR SIGNAL PROCESSING CIRCUIT OF COLOR TELEVISION RECEIVER

[75] Inventors: Yoji Miyasako; Takashi Sugimoto, both of Yokohama; Toru Tanaka, Kawasaki, all of Japan

[73] Assignee: Tokyo Shibaura Denki Kabushiki Kaisha, Kawasaki, Japan

[21] Appl. No.: 307,873

[22] Filed: Oct. 2, 1981

[30] Foreign Application Priority Data

Oct. 8, 1980 [JP] Japan ................. 55-141001

[51] Int. Cl.³ .................. H04N 9/49; H04N 9/535
[52] U.S. Cl. ................................ 358/26; 358/27
[58] Field of Search ................... 358/26, 27

[56] References Cited

FOREIGN PATENT DOCUMENTS 2057223 3/1981 United Kingdom ............. 358/26

Primary Examiner—John C. Martin
Attorney, Agent, or Firm—Finnegan, Henderson, Farabow, Garrett & Dunner

[57] ABSTRACT

In a color signal processing circuit having first and second chroma amplifiers, a burst amplifier for extracting a color burst signal from an output signal of the first chroma amplifier, a synchronous color killer detector for detecting the color burst signal and for turning on/off the second chroma amplifier in accordance with the amplitude of the color burst signal and a peak detection type automatic chroma control circuit for controlling the gain of the first chroma amplifier in accordance with the amplitude of the color burst signal, a switching circuit is provided for operating the automatic chroma control circuit when the output voltage of the color killer detector reaches a second level which is higher than a first level at which the second chroma amplifier is turned on.

3 Claims, 5 Drawing Figures

F I G. 3
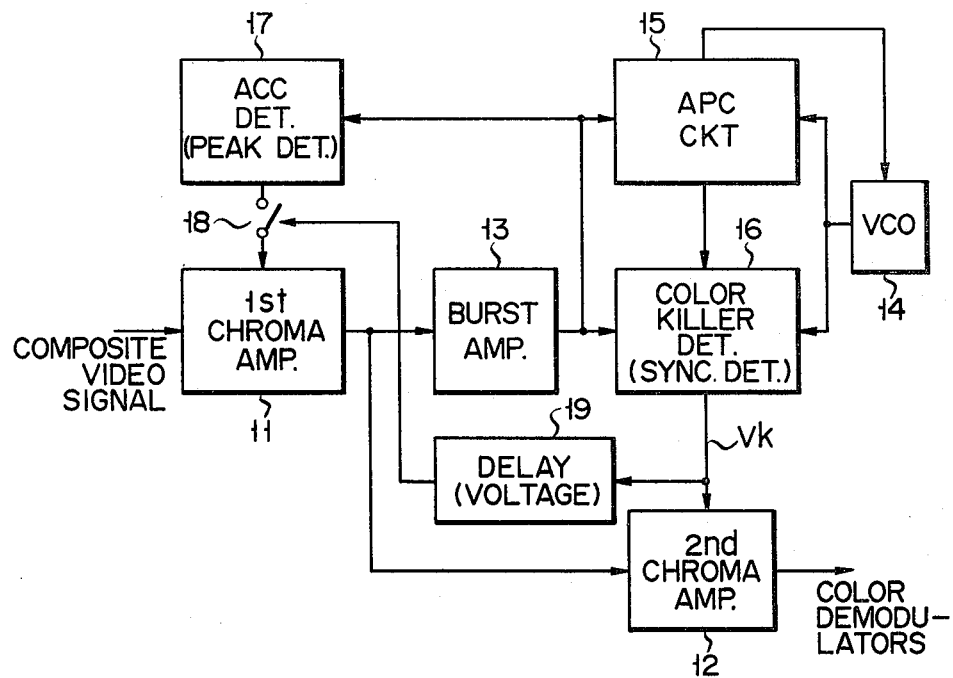
F I G. 4
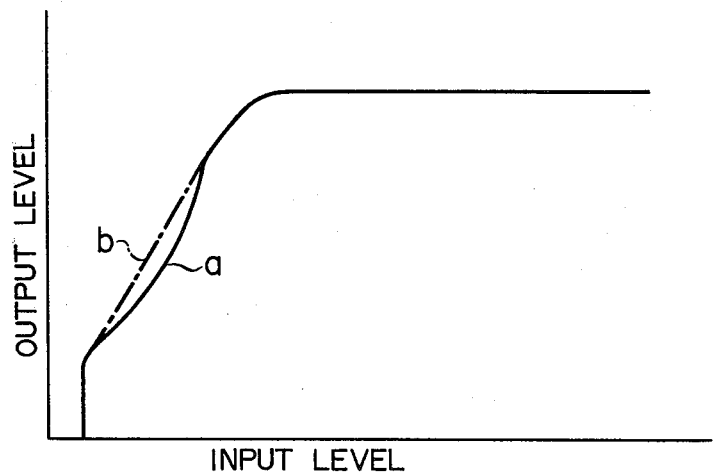

COLOR SIGNAL PROCESSING CIRCUIT OF COLOR TELEVISION RECEIVER

BACKGROUND OF THE INVENTION

The present invention relates to color circuits of a color television receiver and, more particularly, to an automatic chroma control circuit.

Generally, in color circuits of color television receivers, a carrier chroma signal is separated from a composite color video signal, and color signals applied to a color cathode-ray tube are demodulated. The color circuits comprise, as shown in FIG. 1, a first chroma amplifier 11 (band-pass amplifier) for extracting a carrier chroma signal from a composite color video signal, a second chroma amplifier 12 (band-pass amplifier) connected to first chroma amplifier 11, color demodulators (not shown) connected to second chroma amplifier 12 which demodulate color signals, a burst amplifier 13 for extracting color bursts from the carrier chroma signal in response to gate pulses such as horizontal flyback pulses, a voltage-controlled oscillator (VCO) 14 for generating a color subcarrier signal, and an automatic phase control (APC) circuit 15 for controlling the output frequency and phase of VCO 14 in response to the separated color sync bursts. For obtaining a good color picture, the color circuits further comprise a color killer detector 16 responsive to the burst amplifier 13 to cut off second chroma amplifier 12 when a chroma signal is absent or is very small, and an automatic chroma control (ACC) circuit (ACC detector circuit) 17 responsive to the burst amplifier 13 to reduce the gain of first chroma amplifier 11 as the carrier chroma signal received becomes greater so that the output level of the carrier chroma signal is maintained constant.

In FIG. 1, color killer detector 16 is of synchronous detection type which compares in phase the color sync burst signal and the output signal from VCO to produce a color killer voltage. ACC detector circuit 17 is of peak detection type which detects a peak value of the color sync burst signal. Peak ACC detector circuit 17 is susceptible to influence of noise. Accordingly, when a color signal is small, the color signal is made smaller since ACC detector circuit 17 operates from noise generated in the color television receiver. Therefore, a color missing signal level becomes adversely higher than that under the condition in which there is no noise, as shown in FIG. 2. In FIG. 2, curve a shows input/output characteristics of the color signal processing circuit when there is noise, while curve b shows input/output characteristics when there is no noise.

SUMMARY OF THE INVENTION

An object of the present invention is to provide a color signal processing circuit of a color television receiver in which the influence of noise on a color missing signal level is greatly reduced.

According to the present invention, an automatic chroma control circuit for controlling the gain of a first chroma amplifier is coupled to the output of a color killer circuit responsive to a color burst signal to turn ON or OFF a second chroma amplifier. The automatic chroma control circuit is arranged to start to control the gain of the first chroma amplifier when an output voltage of the color killer circuit, which increases with increasing amplitude of a color burst signal, reaches a second level which is higher than a first level at which the second chroma amplifier is turned ON. Therefore, according to this invention, the color missing signal level (killer threshold) is not influenced by noise.

BRIEF DESCRIPTION OF THE DRAWINGS

FIG. 3 is a block diagram of a color signal processing circuit embodying the present invention;

FIG. 4 is a graph showing input/output characteristics of the color signal processing circuit of FIG. 3.

DETAILED DESCRIPTION OF THE PREFERRED EMBODIMENT

Figure 1:
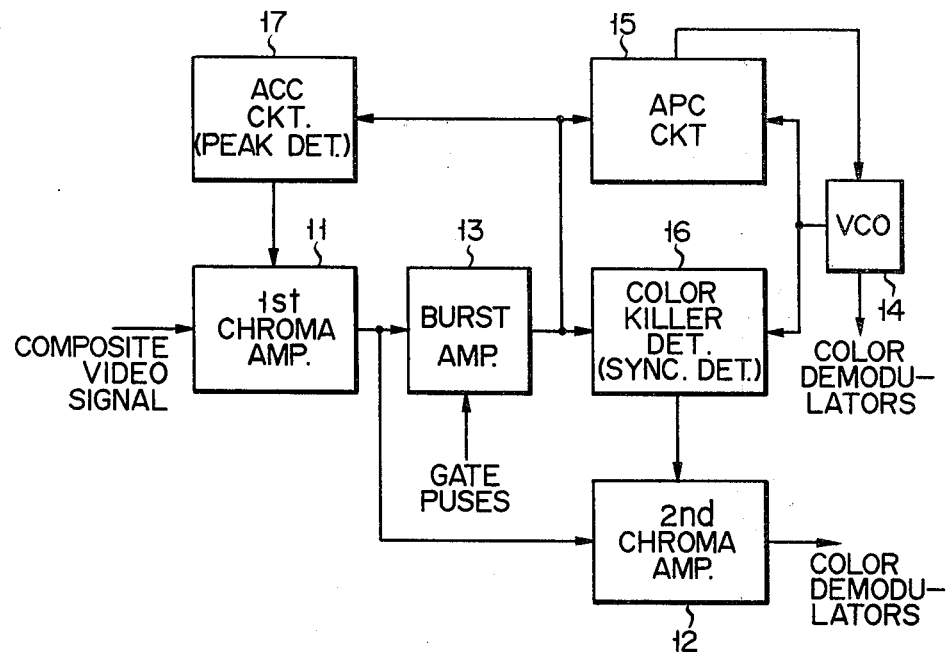
FIG. 1 is a block diagram of a conventional color signal processing circuit of a color television receiver.
Figure 2:
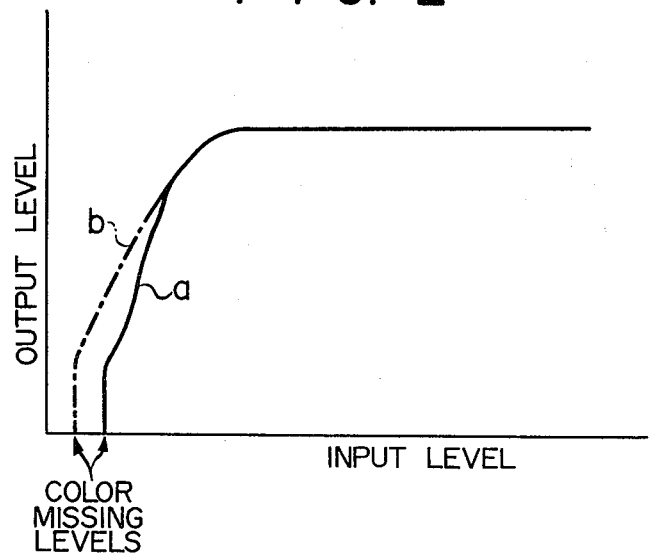
FIG. 2 is a graph showing input/output characteristics of the color signal processing circuit of FIG. 1.

Referring to FIG. 3, there is shown a block diagram of a color signal processing circuit embodying the present invention, wherein the same reference numerals in FIG. 3 denote the same parts as in FIG. 1.

According to the basic concept of the present invention, a switch 18 is inserted between ACC detector circuit 17 and first band-pass amplifier 11, which is controlled by a delay circuit (voltage delay circuit) 19 connected to the output of color killer detector 16.

When a color sync signal is not received, that is, when no signal is received or a monochrome (black and white) signal is received, the output voltage Vk of color killer detector 16 is low so that second band-pass amplifier 12 is turned OFF. The switch 18 turns OFF in response to this low output voltage Vk of color killer detector 16. Therefore, the gain of first band-pass amplifier 11 is set at a high level.

When a small color signal is received, that is, when the amplitude of the color burst signal is small, the output voltage Vk of color killer detector 16 becomes larger than when receiving a monochrome signal. As a result, the second band-pass amplifier 12 is turned ON to apply a carrier chroma signal to color demodulators. In this condition, second band-pass amplifier 12 has a gain corresponding to a control voltage applied from a separate source. The switch 18 is kept OFF, so that first band-pass amplifier 11 amplifies the carrier chroma signal with a relatively high gain.

When the amplitude of the color burst signal becomes larger, the output voltage Vk of color killer detector 16 becomes correspondingly larger. Delay circuit 19 responds to an increase in the output voltage Vk of color killer detector 16 to turn ON switch 18. As a result, first band-pass amplifier 11 amplifies the carrier chroma signal with the gain corresponding to the amplitude of the color burst signal in response to ACC detector circuit 17. At this time, the gain of first band-pass amplifier 11 is smaller than the case in which switch 18 is kept OFF.

With a construction as described above, adverse effect on the color missing signal level due to noise can be eliminated, as shown in FIG. 4. In this figure, curve a indicates input/output characteristics in the presence of noise, while curve b indicates input/output characteristics in the absence of noise. The color missing signal level in the presence of noise can be made substantially the same as that in the absence of noise.

Figure 5:
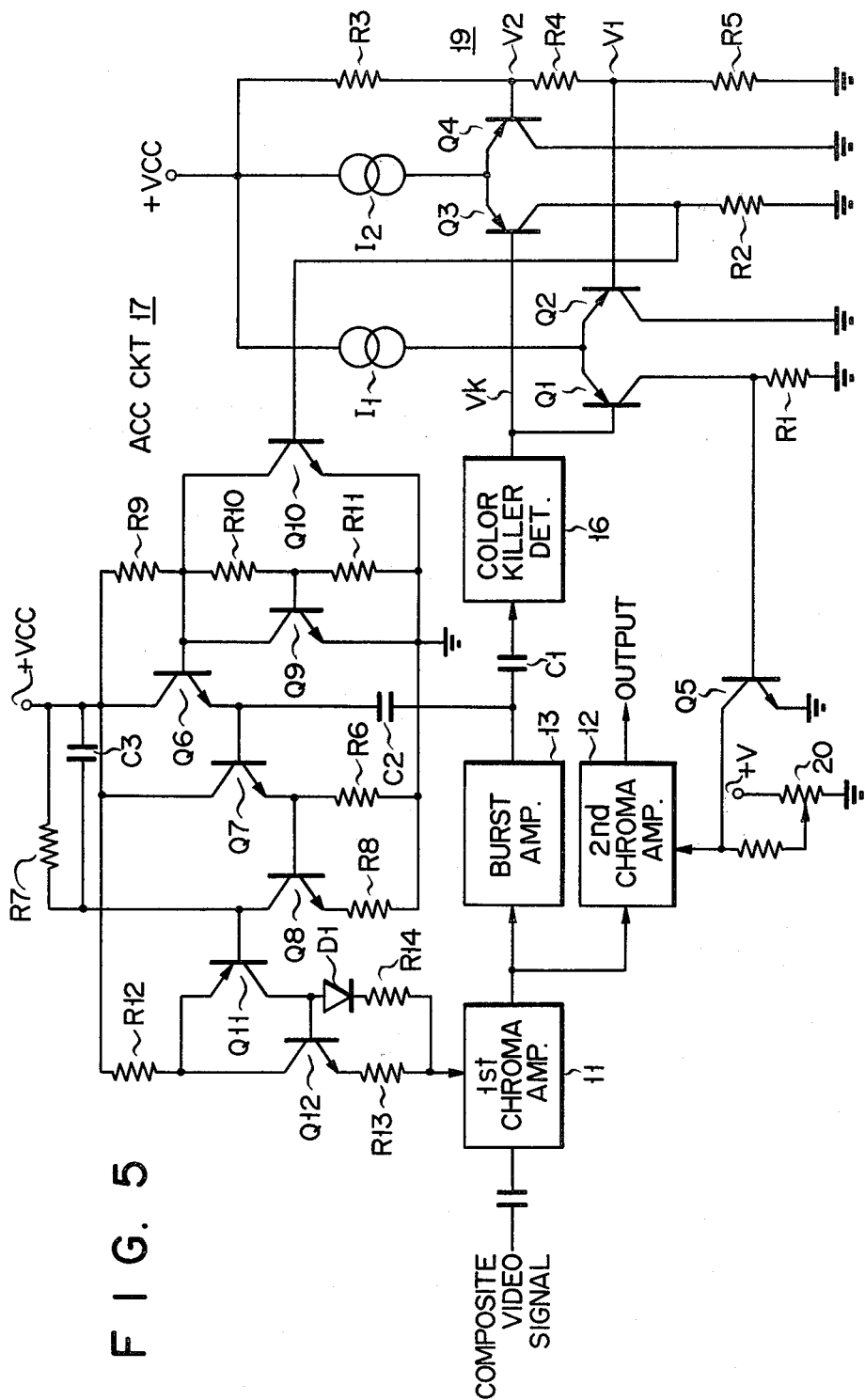
FIG. 5 shows a practical circuit arrangement of an automatic chroma control circuit and a delay circuit shown in FIG. 3.

FIG. 5 shows a practical circuit arrangement of ACC detector circuit 17 and voltage delay circuit 19 shown in FIG. 3.

Output signal of burst amplifier 13 is supplied to color killer detector 16 and ACC detector circuit 17 through capacitors C1 and C2, respectively. The DC output voltage Vk of color killer detector 16 is applied to the base of a PNP transistor Q1 having its emitter coupled to the emitter of a PNP transistor Q2, and to the base of a PNP transistor Q3 having its emitter coupled to the emitter of a PNP transistor Q4. The collector of transistor Q1 is connected to ground through a resistor R1, while the collector of transistor Q2 is directly connected to ground. The collector of transistor Q3 is connected to ground through a resistor R2, while the collector of transistor Q4 is directly connected to ground. The emitters of differential transistors Q1 and Q2 are connected to a power source (+Vcc) through a current source I1, while the emitters of differential transistors Q3 and Q4 are connected to the power source (+Vcc) through a current source I2. Resistors R3, R4 and R5 are connected in series between the power source (+Vcc) and ground. The base of transistors Q2 is connected to a connection point (voltage V1) of resistors R4 and R5, while the base of transistor Q4 is connected to a connection point (voltage V2>V1) of resistors R3 and R4.

Among the elements described above, transistors Q3 and Q4, resistors R2 to R5, and current source I2 constitute voltage delay circuit 19 shown in FIG. 3.

A color level control means 20 is connected to second band-pass amplifier 12 and the collector-emitter path of a transistor Q5 is connected in parallel with color level control means 20. The base of transistor Q5 is connected to a connection point of resistor R1 and collector of transistor Q1.

In ACC detector circuit 17, the burst signal is applied through capacitor C2 to the emitter of a transistor Q6 having its collector connected to the power source (+Vcc). The emitter of transistor Q6 is connected to the base of a transistor Q7 having its collector connected to power source (+Vcc) and its emitter connected to ground through a resistor R6. The emitter of transistor Q7 is connected to the base of a transistor Q8 having its collector connected to power source (+Vcc) through a parallel combination of a resistor R7 and a capacitor C3, and its emitter connected to grounded through a resistor R8. Resistor R7 is considerably larger in value than resistor R8. Transistors Q7 and Q8 constitute a peak director.

Resistors R9, R10 and R11 are connected in series between power source (+Vcc) and ground. The base of transistor Q6 is connected to a connection point of resistors R9 and R10. A transistor Q9 has its collector connected to the base of transistor Q6, its emitter grounded and its base connected to a connection point of resistors R10 and R11. A transistor Q10, which corresponds to switch 18 shown in FIG. 3, has its collector connected to the base of transistor Q6, its emitter grounded and its base connected to the collector to transistor Q3. A circuit including transistors Q6, Q9 and Q10 applies a reference voltage to the peak detector.

A pnp transistor Q11 has it base connected to the collector of transistor Q8, its emitter connected to power source (+Vcc) through a resistor R12 and its collecter connected to the base of an NPN transistor Q12. The emitter and base of transistor Q12 are connected to a control input of first chroma amplifier 11 through a resistor R13 and through a series combination of a diode D1 and a resistor R14, respectively. Transistors Q11 and Q12, resistors R12 to R14, and diode D1 act as a voltage-to-current conversion circuit for converting the collector voltage of transistor Q8 to a control current which controls the gain of first chroma amplifier 11.

Operation of the color signal processing circuit shown in FIG. 5 will be described hereinafter.

With zero signal input condition or when receiving a monochrome signal, a color burst signal is not present at the output of burst amplifier 13 so that the output voltage Vk of color killer detector 16 is lower than the base voltage V1 of transistor Q2. Transistor Q1 is thus rendered conductive. Since $Vk > V2$, transistor Q3 is also rendered conductive.

Due to the voltage drops across resistors R1 and R2, transistors Q5 and Q10 are rendered conductive. The control input of second chroma amplifier 12 is grounded due to the conduction of transistor Q5. As a result, second chroma amplifier 12 is cut off. On the other hand, in ACC circuit 17, since transistor Q10 is rendered conductive, transistors Q6 to Q8, Q11 and Q12 are all rendered nonconductive. Namely, ACC circuit 17 is electrically disconnected from first chroma amplifier 11.

In a color signal receiving condition, when the amplitude of color burst signal from burst amplifier 13 is small, the output voltage Vk of color killer detector 16 is lower than V1. Therefore, in this case, the same operation as in the case of reception of a monochrome signal is performed.

With increase in the amplitude of the color signal, or with increase in the amplitude of the color burst signal from burst amplifier 13, the output voltage Vk of color killer detector 16 becomes high. When the output voltage Vk exceeds V1, transistor Q1 turns OFF. As a result, transistor Q5 is turned OFF, so that second chroma amplifier 12 is turned ON. Under this condition, second chroma amplifier 12 amplifies a carrier chroma signal with a gain dependent on the magnitude of a control voltage which is set by color level control means 20. When $Vk > V2$, transistors Q3 and Q10 still remain conductive so that ACC circuit 17 is disabled from controlling the gain of first chroma amplifier 11. Accordingly, first chroma amplifier 11 amplifies carrier chroma signal with a relatively high gain.

When there is television receiver noise, the amplitude of the color burst signal is small. Therefore, even if transistor Q10 is kept ON, the transistors Q7, Q8, Q11 and Q12 may turn ON due to noise. In this case, the amplitude V01 (peak-to-peak) of the color burst signal supplied to ACC circuit 17 from burst amplifier 13 through capacitor C2 is given by $$V01 = VBE(Q7) + VBE(Q8) - VCEsat(Q10) + VBE(Q6)$$

where VBE(Q7), VBE(Q8) and VBE(Q6) denote base-to-emitter voltages of transistors Q7, Q8 and Q6, respectively, and VCEsat (Q10) denotes the collector-to-emitter voltage of transistor Q10 when saturated.

The positive peak of color burst signal from burst amplifier 13 is determined by the sum of the base-to-emitter voltages of transistors Q7 and Q8 which constitute the peak detector, while the negative peak is determined by the base-to-emitter voltage of transistor Q6 minus VCEsat of transistor Q10.

The collector voltage of transistor Q8 is maintained at a DC voltage of magnitude depending of V01 due to filter action of the parallel combination of resistor R7 and capacitor C3. A control current depending on this DC voltage is applied to first chroma amplifier 11. As a result, first chroma amplifier 11 amplifies carrier chroma signal with a gain dependent on V01.

When the burst signal becomes large and the output voltage Vk of color killer detector 16 exceeds V2, transistor Q3 turns OFF so that transistor Q10 turns OFF.

A magnitude V02 (peak-to-peak) of the color burst signal supplied from burst amplifier 13 to ACC circuit 17 when transistor Q10 is rendered nonconductive is given by $$V02 = VBE(Q7) + VBE(Q8) - [(R10+R11)/R10] \cdot VBE(Q9) + VBE(Q6)$$

Since $[(R10+R11)/R10] \cdot VBE(Q9) > VCEsat\ (Q10)$, V02 is smaller than V01.

The gain of the first chroma amplifier 11 becomes smaller when a large color signal is received than when a small color signal is received. Accordingly, when a small color signal is received, since the carrier chroma signal is amplified in first chroma amplifier 11 with a large gain, adverse effects on the color missing signal level can be eliminated.

What we claim is:

1. A color signal processing circuit of a color television receiver comprising:
    a first chroma amplifier for separating a carrier chroma signal from a composite color video signal;
    a second chroma amplifier coupled to said first chroma amplifier;
    a burst amplifier for separating a color burst signal from an output signal of said first chroma amplifier;
    a synchronous detector type color killer circuit responsive to said burst amplifier to cut off said second chroma amplifier when the amplitude of the color burst signal from said burst amplifier is small and to turn ON said second chroma amplifier when the amplitude of the color burst signal reaches a predetermined level, a control output voltage level of said color killer circuit increasing with an increase in the amplitude of the color burst signal;
    a peak detector type automatic chroma control circuit for controlling the gain of said first chroma amplifier in response to said burst amplifier; and
    circuit means responsive to said color killer circuit for initiating the operation of said automatic chroma control circuit when the control output voltage level of said color killer circuit reaches a second voltage level which is higher than a first voltage level at which said second chroma amplifier turns ON.

2. A circuit according to claim 1, wherein said automatic chroma control circuit comprises a peak detector circuit which receives the output signal from said burst amplifier, and a reference voltage setting circuit responsive to said circuit means for applying a first reference voltage to said peak detector when the control output voltage level of said color killer circuit is lower than the second voltage level, and for applying a second reference voltage to said peak detector when the control output voltage level of said color killer circuit is higher than the second voltage level.

3. A circuit according to claim 2, wherein said reference voltage setting circuit comprises a first transistor having its emitter coupled to an input end of said peak detector and its collector coupled to a power source; first and second resistors connected in series between base of said first transistor and ground; a second transistor having its collector coupled to base of said first transistor, its emitter grounded and its base coupled to a connection point of said first and second resistors; and a third transistor having its collector coupled to the base of said first transistor, its emitter grounded, and its base coupled to said circuit means such that it is turned off when the control output voltage of said color killer circuit is higher than the second voltage level.

* * * * *